US012169271B2

(12) United States Patent
Schwedt et al.

(10) Patent No.: US 12,169,271 B2
(45) Date of Patent: Dec. 17, 2024

(54) METHOD FOR EVALUATING MEASUREMENT DATA FROM A LIGHT FIELD MICROSCOPE, AND APPARATUS FOR LIGHT FIELD MICROSCOPY

(71) Applicant: Carl Zeiss Microscopy GmbH, Jena (DE)

(72) Inventors: Daniel Schwedt, Jena (DE); Tiemo Anhut, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 189 days.

(21) Appl. No.: 17/939,294

(22) Filed: Sep. 7, 2022

(65) Prior Publication Data

US 2023/0070373 A1      Mar. 9, 2023

(30) Foreign Application Priority Data

Sep. 7, 2021 (DE) ..................... 10 2021 123 148.5

(51) Int. Cl.
*G02B 21/36* (2006.01)
*G02B 21/00* (2006.01)

(52) U.S. Cl.
CPC ......... *G02B 21/367* (2013.01); *G02B 21/002* (2013.01)

(58) Field of Classification Search
CPC .................. G02B 21/002; G02B 21/367
See application file for complete search history.

(56) References Cited

U.S. PATENT DOCUMENTS

| 2017/0168284 A1* | 6/2017 | Singer .................. G02B 21/008 |
| 2017/0205615 A1* | 7/2017 | Vaziri ................. G02B 21/0072 |
| 2018/0213139 A1* | 7/2018 | Ito ......................... H04N 5/2625 |
| 2022/0043246 A1* | 2/2022 | Anhut .................. G02B 21/367 |

FOREIGN PATENT DOCUMENTS

| DE | 10 2015 121 403 A1 | 6/2017 |
| DE | 10 2018 220 779 A1 | 6/2020 |
| DE | 10 2020 209 889 A1 | 2/2022 |

OTHER PUBLICATIONS

EP Search Report and Written Opinion issued in co-pending EP Application No. 22193806.1 dated Apr. 20, 2023.
German Search Report for DE 10 2021 123 148.5 dated Mar. 2, 2022.

* cited by examiner

*Primary Examiner* — Jayanti K Patel
*Assistant Examiner* — Christopher Kingsbury Glover
(74) *Attorney, Agent, or Firm* — Duane Morris LLP

(57) ABSTRACT

A method for evaluating measurement data from a light field microscope, and an apparatus for light field microscopy wherein the following steps are carried out: a) at least one sample position to be analyzed is selected in a sample; b) images of the sample, which each contain a set of partial images, are recorded at a sequence of recording times using a light field microscope; c) the positions corresponding to the selected sample positions are determined in the partial images of the images recorded in step b); d) the image signals are extracted from at least some of the partial images at the positions determined in partial step c); e) an integrated signal is obtained for a certain recording time by virtue of the image signals extracted for a certain position from partial images of this recording time in step d) being integrated to form the integrated signal; and f) a time profile of the integrated signal is obtained by virtue of step e) being carried out for a plurality of recording times.

27 Claims, 3 Drawing Sheets

METHOD FOR EVALUATING MEASUREMENT DATA FROM A LIGHT FIELD MICROSCOPE, AND APPARATUS FOR LIGHT FIELD MICROSCOPY

RELATED APPLICATIONS

The present application claims priority benefit of German Application No. DE 10 2021 123 148.5 filed on Sep. 7, 2021, the contents of which is incorporated by reference in its entirety.

FIELD OF THE INVENTION

In a first aspect, the invention relates to a method for evaluating measurement data from a light field microscope. In a second aspect, the invention relates to an apparatus for light field microscopy.

BACKGROUND OF THE INVENTION

A generic apparatus for light field microscopy contains at least the following components: a light field microscope having a light source for emitting excitation light, comprising an illumination beam path with at least one microscope objective for guiding the excitation light onto or into a sample, a two-dimensionally spatially resolving detector for detecting the light emitted by the sample, comprising a detection beam path with at least one micro-lens array for guiding the light emitted by the sample onto the detector, and a control and evaluation unit for controlling the light source and the detector and for evaluating the measurement data obtained by the detector.

Processes in organs, tissues and organisms are increasingly being examined in biomedical research. By way of example, the neuronal reaction to stimuli or the propagation of pulses in the muscle tissue is of interest in this case. Primarily, this does not require structural examinations at the highest resolution but instead the fast acquisition of three-dimensional image data. Then, a temporal and/or spatial relative change of fluorescent signals is measured in these image data, that is to say where $F_0$ is an intensity measured at a first time or at a first point in space and $\Delta F$ is a change of the signal from the first time to the second time or from the first point to a second point in space. The actual image is only a source of data and, as a rule, serves for no further analysis. Since neuronal structures for example remain substantially stationary during the fast volume recording, the fast temporal information can be assigned to certain regions of the neuronal structures, for example if the structure is recorded at the start of the measurement or at any other time during the measurement.

Light field microscopy (LFM) is increasingly used for recording images quickly. An advantage of light field microscopy is that a volume of several ten to hundred micrometers can be reconstructed from a single camera recording, which as a rule is implemented within fractions of seconds. Various embodiments are possible in light field microscopy. In what is known as spatial domain light field microscopy, a micro-lens array (MLA) is arranged in the detection beam path in a plane conjugate to the object plane. Then, detection is carried out using a camera sensor in the back focal plane of said micro-lens array, this back focal plane then being optically conjugate to the back focal plane (BFP) of the microscope objective.

A method more intuitive for microscopy is what is known as the Fourier light field microscopy, in which the micro-lens array (MLA) is arranged in a plane conjugate to the pupil plane of the objective. Detection is once again implemented in the back focal plane (BFP) of the micro-lens array. In this case, real image representations of the sample volume are captured as partial images within the recorded camera image, said real image representations however in each case belonging to different parallactic viewing directions onto the sample. On account of the parallax, an—imaginary— axial shift of an emitting fluorescence molecule in the object space causes a lateral shift of the signal on the camera sensor which is dependent on the position of the respectively considered micro-lens.

Various algorithms are available for reconstructing the structural volume information from the raw data. A first algorithm initially separates all partial image data from the camera image to form an image stack, with each partial image of this stack corresponding to a viewing direction onto the sample. To calculate the image content of a certain axial sample plane, each partial image of this stack is now shifted by the parallactic shift expected for the chosen axial plane. Then, the stack generated thus is summated to form an image of a z-plane. To obtain a three-dimensional image, which is also referred to as a 3-D stack, this method is then repeated for the further planes and a three-dimensional image is then assembled from images for the individual z-planes. The disadvantage of this method, which is also referred to as a shift & sum (S&S) method, is that detail information may be significantly overlaid by background, especially in the case of densely occupied samples.

A further method uses a joint deconvolution (jDCV) approach. This requires knowledge of the point spread function (PSF) for each micro-lens and the calculation times are significantly longer than in the case of the shift & sum method. In return, a significantly higher contrast image is obtained. However, the disadvantage of this method is that intensity relationships might not be maintained on account of its nonlinear character.

Both the shift & sum method and the jDCV method serve to provide the three-dimensional image information and to supply the best possible structural image representation of the sample.

Objectives of the Invention

An object of the invention can be considered to be that of providing a method and an apparatus which facilitate the examination of local dynamic processes with a high temporal resolution and a good signal-to-noise ratio.

This object is achieved by the method and an apparatus having the features set forth in the annexed claims.

SUMMARY OF THE INVENTION

Advantageous variants of the method according to the invention and preferred embodiments of the apparatus according to the invention are explained below, especially in conjunction with the dependent claims and the drawing.

The following method steps are carried out in the method according to the invention for evaluating measurement data from a light field microscope:
a) at least one sample position to be analyzed is selected in a sample;
b) images of the sample, which each contain a set of partial images, are recorded at a sequence of recording times using a light field microscope;

c) the positions corresponding to the selected sample positions are determined in the partial images of the images recorded in step b);

d) the image signals are extracted from at least some of the partial images at the positions determined in partial step c);

e) an integrated signal is obtained for a certain recording time by virtue of the image signals extracted for a certain position from partial images of this recording time in step d) being integrated to form the integrated signal; and f) a time profile of the integrated signal is obtained by virtue of step e) being carried out for a plurality of recording times.

According to the invention, the apparatus for light field microscopy of the aforementioned type is developed by virtue of the control and evaluation unit being configured A) to control the light source and the detector to record images of the sample in a sequence of recording times, the images each comprising a set of partial images;

B) to determine positions in the partial images of the images recorded in step A), the positions corresponding to sample positions selected in the sample by a user or by a machine;

C) to extract the image signals from at least some of the partial images at the positions determined in partial step B);

D) to generate an integrated signal for a certain recording time by integrating the image signals extracted for a certain position from partial images of this recording time in step C); and E) to carry out step D) for a plurality of recording times.

The method according to the invention and the apparatus according to the invention are suitable, as a matter of principle, for any type of samples which are accessible to the examination using light field microscopy and in which dynamic processes are intended to be examined with a high time resolution and a good signal-to-noise ratio. In particular, the invention is suitable for the examination of biological samples, in particular the examination of physiological processes in living samples. By way of example, it is possible to consider the sample positions along a trajectory, for example a neural pathway. By way of example, it is then possible to examine how an excitation propagates along the neural pathway. Movements of cell particles can also be examined. Such processes are also referred to as functional traces. By way of example, the method according to the invention and the apparatus according to the invention are also particularly suitable for the examination of calcium transients.

The raw data from the two-dimensionally spatially resolving detector are preferably evaluated in the method according to the invention. This allows high time resolutions.

The fact that the examination of dynamic processes with a high time resolution and a good signal-to-noise ratio does not require a complete reconstruction of the images of the light field microscope and that it is sufficient instead to evaluate the data from the light field microscope only at positions of interest can be considered to be essential insights pro-vided by the present invention.

Obtaining a better contrast in comparison with the shift & sum method and saving significant amounts of time in comparison with joint deconvolution methods can be achieved as essential advantages since the relevant data can be extracted directly from the raw data in the present invention. Moreover, proceeding from the untreated raw data is a significant advantage. These are more reliably evaluable in quantitative fashion. The changes are linear if one stays in the linear sensitivity range of the camera. This cannot be guaranteed in all cases for processed data.

The apparatus according to the invention can be configured to carry out the methods according to the invention.

The light field microscopy can be carried out as fluorescence microscopy and lasers suitable for the fluorescence excitation of the dyes used to prepare the samples to be examined are preferably used as light sources.

In principle, known cameras such as CMOS, CCD or SPAD cameras can be used as two-dimensionally spatially resolving detectors.

The images recorded by the light field microscope in each case comprise a set of partial images. The partial images are those images that are generated on the two-dimensionally spatially resolving detector by a single micro-lens of the micro-lens array.

In a particularly advantageous embodiment of the apparatus according to the invention, the micro-lens array is arranged in a plane optically conjugate to the back pupil of the microscope objective. The partial images belonging to the individual micro-lenses then correspond to images of the sample from different parallactic angles. In this variant referred to as Fourier light field microscopy, the partial images are vividly understandable. However, the present invention is not restricted to Fourier light field microscopy.

Rather, the variant referred to as spatial domain light field microscopy can be used for the method according to the invention and the apparatus according to the invention, within the scope of which the micro-lens array is arranged in a plane optically conjugate to a plane of the sample.

There is much freedom in view of selecting the sample positions to be analyzed. By way of example, the sample position(s) to be analyzed can be selected by a user and/or by machine from a two-dimensional or three-dimensional overview image of the sample. Furthermore, it is possible that the sample position(s) to be analyzed is/are selected by a user on the basis of a visual observation of the sample using an eyepiece. Alternatively or in addition, the sample position(s) to be analyzed can be selected by a user and/or by machine on the basis of a two-dimensional camera image recorded using an EDOF (enhanced depth of fo-cus) method or using an objective with a large depth of field.

It is also important in the case where the sample position(s) to be analyzed is/are selected by a user and/or by machine on the basis of images of the sample that these images need not be recorded or created immediately before the method according to the invention is carried out.

Rather, the method according to the invention can be carried out as subsequent data processing of previously recorded, and consequently available, image data.

The analysis according to the method according to the invention can thus be implemented directly after the image data are recorded, and also as pure post-processing. In principle, all the known methods for recording the two-dimensional or three-dimensional structure information of the sample, even those that are comparatively slow, can be considered for generating those two-dimensional or three-dimensional images used to select the positions to be analyzed.

A two-dimensional or three-dimensional microscopic overview image of the sample is a microscopic image of the example to be examined, in two or in all three spatial dimensions.

By way of example, an overview image of the sample can be obtained using a laser scanning microscope. Using a laser scanning microscope, three-dimensional images are typically obtained as a z-stack, that is to say as a set of images of the planes of the sample at different positions of the optical axis which runs in the z-direction.

A module for laser scanning microscopy can advantageously be present in the apparatus according to the invention for the purpose of recording the three-dimensional overview image of the sample.

Alternatively or in addition, a three-dimensional overview image of the sample can be obtained using the light field microscope, in particular by reconstructing a set of partial images obtained by the light field microscope. Additional device components, for example a module for laser scanning microscopy, are not mandatory in that case.

The reconstruction of the three-dimensional overview image can be obtained by a deconvolution algorithm using the point spread functions of the micro-lenses of a multi-lens array of the light field microscope.

Such methods are also referred to as joint deconvolution methods or jDCV methods. Joint deconvolution methods are comparatively more complex in view of computational outlay but supply higher contrast images.

Alternatively or in addition, the reconstruction of the three-dimensional overview image can be obtained by a calculation of the image content for the individual axial sample planes, with the image content of a certain axial sample plane being calculated by virtue of each partial image of the set of partial images being shifted by a parallactic shift expected for the axial sample plane and with the set of shifted partial images being summated. The three-dimensional overview image is assembled from the image contents for the individual axial sample planes.

Such methods are referred to as shift & sum methods. These methods have a lower computational outlay in comparison with joint deconvolution methods but the image quality is frequently less good because image details are significantly overlaid by the background, especially in the case of densely populated samples.

The term sample position refers to those locations in the sample to be selected at which dynamic processes, for example a neuronal reaction to stimuli or the propagation of pulses in the muscle tissue, are intended to be recorded. A sample position therefore always contains a certain location in the sample and a microscopic volume at the relevant location to be selected by machine or by a user, possibly with machine assistance. The microscopic volume can have linear extents typically of the order of the single-digit and two-digit micrometer range. For the images to be evaluated, this means that a plurality of pixels should always be evaluated for a certain sample position, specifically the pixels located in the volume belonging to the sample position.

The step of selecting one or more sample positions to be analyzed refers to the method step in which the three-dimensional overview image is examined in view of structures of interest and in which the sample positions at which such structures of interest are located are selected for the further examination.

The term a sequence of recording times initially means that a plurality of images are recorded successively in time. Firstly, is an upper limit on the frequency of the recording times that is stipulated by the device in this case. To the extent this is possible with the device, the frequency of the recording times is preferably adapted to match the temporal structure of the process to be examined, in particular the biological process to be examined, for example the excitation of an axon. The time intervals between the individual recording times may vary.

The sample positions in the three-dimensional overview image are uniquely assigned to positions in the partial images of the light field microscope, with the assignment rule being defined by the optical parameters of the detection beam path of the light field microscope, that is to say in particular also by the geometric parameters of the utilized multi-lens array. By way of example, this assignment rule can be derived from the parallactic shifts applied in the shift & sum method.

Method step c) of determining those positions in the partial images corresponding to the sample positions selected in the overview image therefore contains seeking out the respective positions by way of the assignment rule defined by the optical parameters of the detection beam path.

In advantageous variants of the method according to the invention, the positions in the partial images of the light field data that correspond to the sample positions which are selected in the three-dimensional overview image and which are intended to be analyzed are calculated.

In principle, the invention is implemented if the partial images are evaluated at only one position. In preferred variants of the method according to the invention, the images of the sequence of recording times are each evaluated at a multiplicity of positions in accordance with steps a) to f). By way of example, the partial images can be evaluated at positions along a neural pathway in a living sample.

The sample positions to be analyzed can in principle be selected in the three-dimensional overview image by a user, for instance on the basis of a graphical representation of the three-dimensional overview image as a z-stack on a computer monitor. Alternatively or in addition, the selection of sample positions to be analyzed can also be assisted by computer algorithms or be implemented completely automatically by an evaluation unit in further advantageous variants.

By way of example, sample positions selected by a user can be transferred to a convolutional neural network together with a set of partial images, the convolutional neural network proposing to the user a preselection of sample positions to be analyzed in subsequent implementations of the method. It is to be expected that an experiment will be carried out multiple times and that the sample structure will be very similar in the various implementations of the experiment. Accordingly, predictions about the selection to be made in respect of positions to be analyzed are already realistic after several sets of ten iterations.

Likewise, provision can be made for the image data from the three-dimensional overview image and/or from the images of the light field microscope to be machine-analyzed and for structures of interest, that is to say sample positions to be potentially analyzed, to be searched for in the image data.

Algorithms implementing an automatic assignment of image signals to certain structural features can be used for the image evaluation in further advantageous variants of the method according to the invention.

The method according to the invention is implemented if, in accordance with the method step d), the image signals are extracted from at least some of the partial images at the positions determined in partial step c). If all partial images contain meaningful measurement data, for example if the structures of interest do not overlap other structures and are not covered by other structures in any other partial image, the image signals at the positions determined in partial step c) can preferably also be extracted from all partial images. The measurement data are then utilized optimally and the signal-to-noise ratio can be increased in comparison with the evaluation of only a selection of partial images. Against this background, attempts will always be made to evaluate preferably all partial images containing meaningful image data.

The partial images from which the image signals are extracted at the positions determined in partial step c) can, as a matter of principle, be selected by a user.

By way of example, a set of partial images of an image of the sample recorded by the light field microscope can be partly or completely represented graphically, for example on a computer monitor, for the selection of partial images from which the image signals are extracted at the positions determined in partial step c).

Additionally or as an alternative, the selection of the partial images from where the image signals are intended to be extracted can also be implemented partly, for example in assisted fashion, by an evaluation unit or completely automatically by an evaluation unit. By way of example, it is conceivable that an evaluation unit proposes partial images to be selected and/or to be discarded for a user.

In the simplest case, the integration of the extracted image signals to form the integrated signal contains the summation of the respective image signals. The image signals to be integrated can still be weighted by a weight function which, for example, weights signals of pixels from the center of a considered volume, for example an ellipsoid, more strongly than signals from the edge of the considered volume.

A time profile of the integrated signal is obtained by virtue of step e) being carried out for a plurality of recording times.

In preferred variants of the method according to the invention, integration regions for calculating the integrated signals can be defined graphically in a graphical representation of the partial images, in particular of portions of the partial images. This can be implemented interactively by a user and in particular in a manner assisted by a segmentation algorithm.

By way of example, a user can graphically define an integration region for calculating a signal in the depicted extracted signals by virtue of the region to be integrated being edged, for instance using an ellipse.

It is also possible for the definition of the integration regions for calculating the integrated signals to be implemented fully automatically by a segmentation algorithm, in particular not in graphical fashion as well.

Advantageously, a minimum value or a start value, in particular the minimum value of the integrated signal obtained for the evaluated images from the sequence of recording times or the integrated signal obtained for the first image in time, can also be subtracted from the integrated signals determined for a certain position in step e). Alternatively, the integrated signal can be divided by the minimum value or the start value.

A time profile of the integrated signal, also referred to as signal trace, can be represented graphically for at least one evaluated position, preferably for plurality of evaluated positions and in particular for every evaluated position.

It is also possible that the measurement data of pixels to be selected are correlated in order to obtain a higher signal intensity vis-à-vis the noise.

Artifacts may arise in the image data from living biological samples, for example as a result of the heartbeat or the respiration of an examined living animal, for instance a mouse.

Using the developments of the method according to the invention described below, it is possible to determine and correct such artifacts.

In a preferred variant of the method according to the invention, a time-varying shift of images of the sample recorded at different recording times can be determined by virtue of the images recorded at different recording times being compared to one another.

Advantageously, it is possible in particular to compare images that directly fol-low one another in time.

By way of example, a spatial correlation can be calculated for the images to be compared for the purposes of the comparison of images recorded at different recording times.

In principle, strongly deviating, for instance significantly shifted, and in this respect unsuitable images can simply be removed from the time series of the images to be evaluated such that only images that fit one another are evaluated. However, this gives away measurement data, possibly to a significant extent.

In principle, direction and magnitude of a shift of the content of the images correlated with one another can also be determined from a spatial correlation. Thus, it is possible to determine a displacement vector, by means of which the images can be pushed onto one another such that the images thus pushed onto one another are able to be evaluated together again.

In such a method, a displacement vector relative to a reference image, for example the last image recorded prior to the relevant recording time, is determined for at least one recording time, in particular for a plurality of recording times and in particular for each recording time, for an image recorded at this recording time, and the set of partial images of the image is corrected using the respective determined displacement vector prior to the further processing.

Shifts can be compensated more quickly if only a selection of advantageous partial images, in particular less than ten partial images, preferably less than five partial images and particularly preferably two partial images, is evaluated in each case for the analysis of time-varying shifts of images of the sample recorded at different recording times.

By way of example, the central partial image can in each case be analyzed for images recorded at different recording times in order to determine lateral shifts with respect to the optical axis, and a partial image from a lens located on an outer ring of the multi-lens array, in particular on the edge, can be analyzed in order to detect axial displacements, in particular displacements parallel to the optical axis.

BRIEF DESCRIPTION OF THE DRAWINGS

Further advantages and properties of the present invention are described below with reference to the attached drawings, in which.

DESCRIPTION OF THE INVENTION

Figure 1:
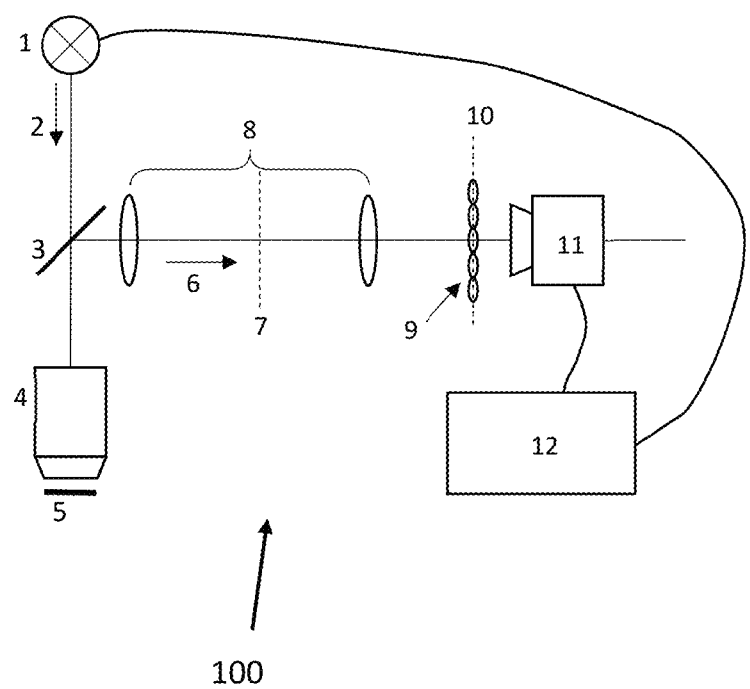
FIG. 1: is a schematic overview of a light field microscope according to the invention.

An example of an apparatus according to the invention which is configured to carry out the method according to the invention is explained with reference to FIG. 1. The apparatus shown therein contains a light field microscope 100 which comprises the following as essential components: a light source 1, typically one or more lasers, for emitting excitation light 2, an illumination beam path with at least one microscope objective 4 for guiding the excitation light 2 onto or into a sample 5, a two-dimensionally spatially resolving detector 11 for detecting light 6 emitted by the sample 5, and a detection beam path with at least one micro-lens array 9 for guiding the light 6 emitted by the sample 5 onto the detector 11. The detector 11 is arranged in or in the vicinity of a focal plane of the micro-lens array 9 and can typically be a CMOS, CCD or SPAD camera. The micro-lens array 9 could also be part of the objective 4 and be arranged in its back focal plane.

Finally, a control and evaluation unit 12, which may in particular be a computer of the type known per se, is present for the purposes of controlling the light source 1 and the detector 11 and for the purposes of evaluating the measurement data obtained from the detector 11.

The light 2 emitted by the light source 1, in particular excitation light for fluorescent dyes used to prepare the sample 5, reaches the microscope objective 4 through a dichroic beam splitter 3 and is focused into a sample plane on or in the sample 5 by means of said microscope objective. Emission light emitted by the sample 5, in particular fluorescence light emitted by fluorescent dyes, returns to the dichroic beam splitter 3 via the microscope objective 4 and is reflected at said dichroic beam splitter in the direction of the relay optical unit 8. The relay optical unit 8 consists of two lenses arranged like a telescope with respect to one another. An intermediate image plane, that is to say a plane optically conjugate to the sample plane, is situated at the position 7. After passing through the relay optical unit 8, the emission light reaches a micro-lens array 9, which is arranged in a plane optically conjugate to the back focal plane of the microscope objective 4 (objective pupil BFP). The individual lenses of the micro-lens array 9 generate partial images 201, . . . , 289 (see FIG. 2) on the detector 11 arranged in a focal plane of the micro-lens array 9, said partial images respectively showing individual images of the sample 5 from different angles, more precisely: different parallax angles. Thus, an image 200 recorded using the light field microscope 100 comprises a respective set of partial images 201, . . . , 289 (see FIG. 2).

The arrangement with the micro-lens array 9 arranged in a pupil plane, shown in FIG. 1, is a structure for Fourier light field microscopy. Alternatively, what is known as spatial domain light field microscopy would also be possible for implementing the invention, within the scope of which a micro-lens array is arranged in a plane in the detection beam path optically conjugate to the object plane (rather than the back focal plane of the microscope objective 4). The raw image information obtained by the spatial domain light field microscopy is related to that obtained by Fourier light sheet microscopy by way of a Fourier transform. Ulti-mately, the result of both methods is in principle the same, however.

A module for laser scanning microscopy, not shown in FIG. 1, may be available for the purposes of recording a three-dimensional overview image of the sample 5.

In real embodiments, the apparatus 100 according to the invention may comprise numerous further optical components, in particular mirrors, lenses, color filters and stops, the function of which is known per se, and which are therefore not specifically described in the present description.

According to the invention, the control and evaluation 12 is configured

A) to control the light source 1 and the detector 11 to record images 200 of the sample 5 in a sequence of recording times, B) to determine positions "a" in the partial images 201, . . . , 289 (see FIG. 2) of the images 200 recorded in step A), the positions corresponding to sample positions selected in the sample by a user or by a machine, in particular in a microscopic overview image of the sample obtained in advance;

C) to extract the image signals from at least some of the partial images p1, p2, p3, p8, p9 (see FIGS. 2 and 3) at the positions "a" determined in partial step B);

D) to generate an integrated signal for a certain recording time by integrating the image signals extracted for a certain position "a" from partial images of this recording time in step C); and E) to carry out step D) for a plurality of recording times.

Variants of methods according to the invention for evaluating measurement data from a light field microscope are described with reference to FIGS. 1 to 3, in particular FIGS. 2 and 3.

Initially, a three-dimensional overview image of the sample 5 can be obtained in the variant of the method according to the invention described here. However, this is not mandatory, as explained above. The three-dimensional overview image can be obtained, for example, using a laser scanning microscope not depicted in FIG. 1 and/or by reconstructing a set 200 of partial images 201, . . . , 289 obtained by the light field microscope 100.

The above-described methods can be used for reconstructing the three-dimensional overview image from a set 200 of partial images obtained using the light field microscope 100.

Then, in step a) at least one sample position to be analyzed is selected from the three-dimensional overview image. The sample positions to be analyzed can be selected from the three-dimensional overview image by a user and/or partly or fully automatically by the control and evaluation unit 12. By way of example, sample positions selected by a user can be transferred to a convolutional neural network (CNN) together with a set of partial images 201, . . . , 289, the convolutional neural network proposing a preselection of sample positions to be analyzed for the user in subsequent implementations of the method.

Then, images 200 of the sample 5, which each contain a set of partial images 201, . . . , 289, are recorded at a sequence of recording times using the light field microscope 100 in step b).

Figure 2:
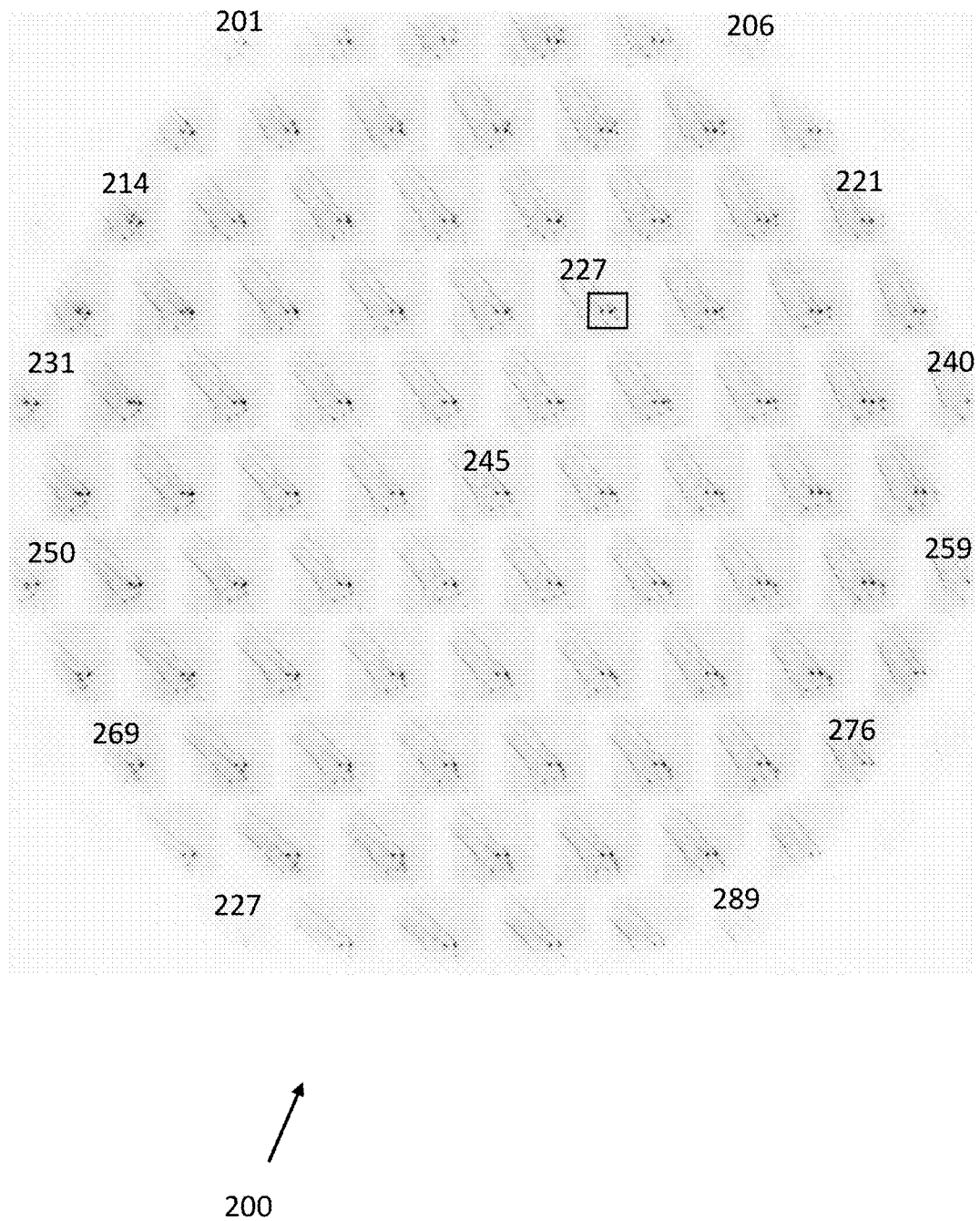
FIG. 2: shows an example of a set of partial images recorded using the light field microscope.

FIG. 2 shows a set of a partial images 201-289, which were recorded using an apparatus of the type shown in FIG. 1. Overall, the image 200 shown in exemplary fashion in FIG. 2 comprises 89 partial images, corresponding to the number of micro-lenses in the micro-lens array 9. These partial images are numbered from 201 to 289 in FIG. 2, from top left to bottom right, with the number being specified for some of the partial images. The examined sample is the dead brain of a mouse. In principle, living organisms can and should also be examined.

Figure 3:
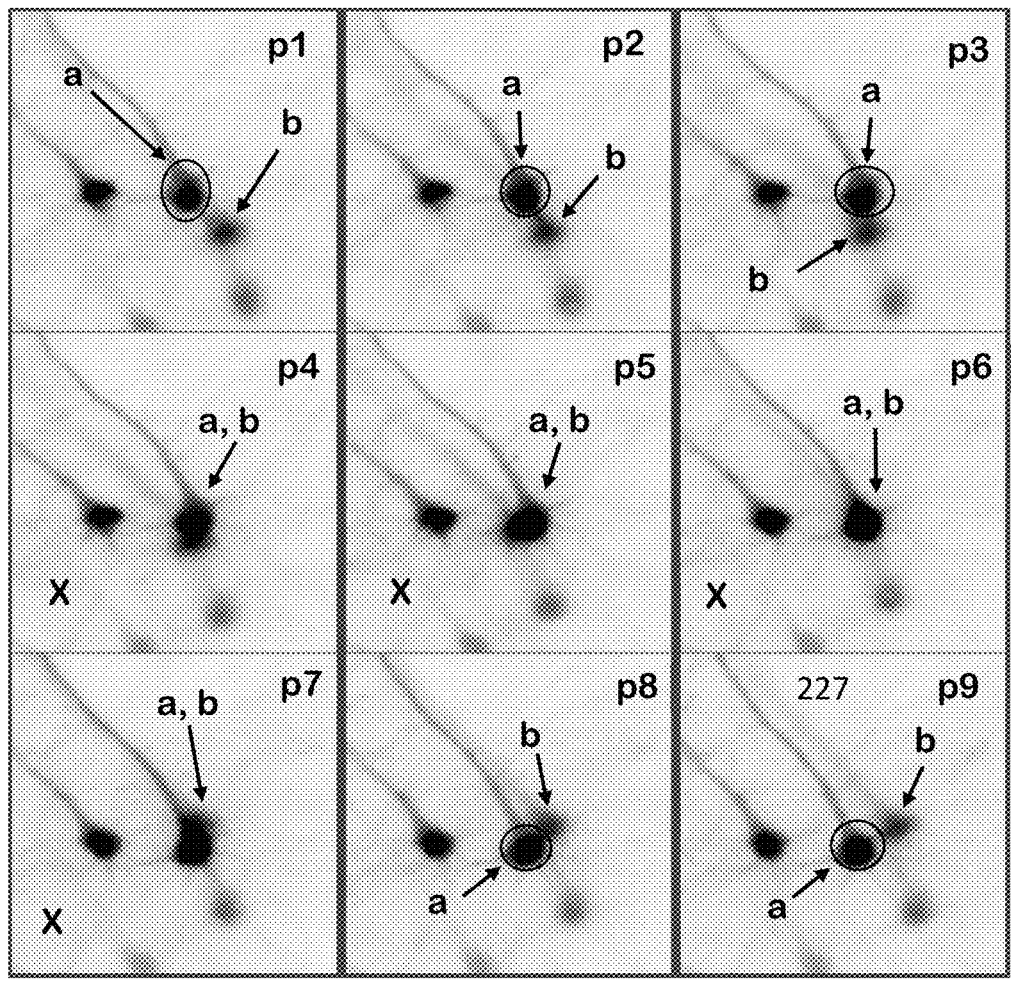
FIG. 3: shows portions from the partial images of FIG. 2 with selected positions.

In the images in FIGS. 2 and 3, bright regions represent a small light input and dark regions represent a high light input on the camera.

Then, in step c), those positions "a" corresponding to the selected sample positions in the overview image are determined in the partial images 201, . . . , 289 of the images 200 recorded in step b); This is always possible because the optical parameters of the light field microscope are known.

Then, in step d), the image signals are extracted from at least some of the partial images at the positions "a" determined in step c) and an integrated signal for a certain recording time is obtained in step e) by virtue of the image signals extracted for a certain position "a" from the partial images of this recording time in step d) being integrated to form the integrated signal. This is described below with reference to FIG. 3.

A set of partial images 201, ..., 289 of an image 200 of the sample 5 recorded by the light field microscope 100 can be partly or completely represented graphically for the selection of the partial images from which the image signals are extracted at the positions "a" determined in step c).

FIG. 3 shows portions p1 to p9 from different partial images in each case. In this case, the portion p9 is a portion from partial image 227, which is likewise shown (not to scale) in FIG. 2. Reference sign "a" denotes a position to be analyzed. Specifically, this is a structure of a nerve cell in the brain of a mouse. It is evident from portions p1 to p9 that the sample appears under a respective different parallax angle when seen from different micro-lenses.

In the graphical illustration of the portions p1, p9 of the partial images, integration regions for calculating the integrated signals can be defined graphically by a user. To delimit the region in which the signals are intended to be integrated a boundary in the form of a circle or an ellipse has been plotted in portion p1 around the position "a", a user for example being able to select the boundary in this way. Corresponding boundaries are also plotted in the image portions p2, p3, p8 and p9. However, such a boundary can also be the result of the segmentation algorithm which was applied to the three-dimensional overview image and as a result of which regions of the sample of potential interest are optionally rendered interactively selectable.

It is also evident in the portions p1, p2, p3, p8 and p9 that a further structure b is situated in the vicinity of the structure (a neuron) at the position "a", said further structure however being located at a different location relative to the position "a" depending on the viewing angle (parallax) into the sample in the various images. To correctly evaluate the data it is necessary to count only those signals which in fact originate from the structure at the position "a" and not those signals which are due to the structure (a further neuron) at the position b. By way of example, the structures "a" and b are immediately adjacent to one another in the image portion p8. However, a separation, as plotted in image portion p8 by a boundary, still seems just possible. However, the structures "a" and b are merged into one another in the image portions p4, p5, p6 and p7, that is to say the structures a and b are behind one another in the viewing direction belonging to these image portions. As it is no longer possible to separate the signals belonging to the structures "a" and b, the image portions p4, p5, p6 and p7 are discarded (depicted by X in these image portions) and these partial images are not taken into account during the further evaluation. Discarding image portions p4, p5, p6 and p7 firstly in-creases the contrast of the extracted traces and moreover avoids incorrect temporal signatures.

Optionally required discarding of image information can firstly be implemented interactively by the user. Then again, the information belonging to two overlapping image sections originating from a segmentation algorithm can also be discarded automatically.

However, it is not mandatory to discard the data from the image portions p4, p5, p6 and p7. For as long as the camera operates in a linear range, it may also be possible to separate the signals again using the ratio, known per se, of the emissions of the two cell regions in the separated partial images. Such a separation will only be no longer possible when shadowing effects by the respective front cell structures become so strong that the ratio of the emissions of two cell regions in separate partial images is no longer maintained.

In a situation where the position "a" to be analyzed is free in all partial images and not overlaid by signals from any other structures, there is no need to discard any partial images and, instead, the signals from all partial images can be integrated. Attempts will be made to utilize the available measurement data as optimally as possible and therefore only those partial images in which the signals cannot be separated in any meaningful way will be discarded.

Finally, a time profile of the integrated signal is obtained in step f) by virtue of step e) being carried out for a plurality of recording times, in particular for all recording times of the considered measurement series.

In order to obtain comparable data, it is possible to subtract a minimum value or a start value from the integrated signals determined in step e) for a certain position "a", or the integrated signal can be divided by the minimum value or the start value.

Finally, the obtained time profiles of the integrated signal, which are also referred to as signal traces, can be represented graphically for the evaluated positions "a".

Heartbeat and/or respiration of the examined mouse may cause time-varying shifts in images 200 of the sample 5 recorded at different recording times. These shifts must be separated from the actual measurement signal.

The images 200 recorded at different recording times can be compared to one another. In particular, it is possible to calculate a spatial correlation for the images 200 to be compared.

Recording raw data by way of Fourier light field microscopy facilitates a detection of movements without the reconstruction of the full three-dimensional information. By way of example, if the assumption is made that the movement of the object is lateral to the optical axis of the objective, the totality of the structures in all partial images are shifted in a correlated and simultaneous manner laterally on the sensor by approximately the same amount. Such a time-varying shift in all partial images can be detected relatively easily, for example by spatially correlating successive images with one another. Then, the relevant images can either be removed from the timeseries or all partial images can be corrected by the determined displacement vector prior to further processing.

For each recording time, a displacement vector relative to a reference image, for example the last image recorded prior to the relevant recording time, can be determined for each image 200 recorded at this recording time and the set of partial images of the respective image 200 can be corrected by the determined displacement vector prior to further processing.

A faster method for determining the displacement vectors is achieved if only a few advantageous partial images, for example only two advantageous partial images, are evaluated in each case for the analysis of time-varying shifts of images 200 of the sample 5 recorded at different recording times. By way of example, in the case of images 200 recorded at different recording times, only the central partial image 245 and a partial image of a lens located at the edge of the multi-lens array 9, for instance in FIG. 2 one of partial images 221 and 240, can be analyzed in each case.

The shifts lateral to the optical axis are obtained from the analysis of the central partial image 245 and the analysis of an outer partial image 221, 240 supplies axial shifts, in particular shifts parallel to the optical axis.

Axial shifts likewise lead to shifts of the totality of the structures lateral to the camera plane, but these shifts are different for every sub-aperture. The shift is zero for a central micro-lens, that is to say a micro-lens located on the optical axis. The lateral shift in-creases, the further the relevant micro-lens is away from the optical axis. Accordingly, it is also possible to correlate to the corresponding sub-apertures of two successive raw data images with one another. This allows lateral and axial movement artifacts to be detected and corrected automatically.

The present invention provides a novel method for evaluating measurement data of a light field microscope and an apparatus for light field microscopy, which achieve significant improvements in the examination of local dynamic processes with a high time resolution and a good signal-to-noise ratio.

While the invention has been illustrated and described in connection with cur-rently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS AND USED ABBREVIATIONS

1 Light source (laser)
2 Excitation light
3 Dichroic beam splitter
4 Microscope objective
5 Sample
6 Emission light
7 Intermediate image plane
8 Relay optical unit
9 Micro-lens array
10 Fourier plane (optically conjugate to the BFP of the microscope objective 4)
11 Detector (camera, in the image plane)
12 Evaluation unit
100 Light field microscope
200 Image from the light field microscope
201 Partial image
227 Partial image
245 Central partial image
289 Partial image
a Selected position to be analyzed in the partial image
b Position adjacent to position a
p1-p9 Portions from various partial images
X means: Image is not evaluated
BFP Back objective pupil (back focal plane)
jDCV Joint deconvolution method
LFM Light field microscope
LSM Laser scanning microscope
MLA Micro-lens array
PSF Point spread function
S&S Shift & sum method

What is claimed is:

1. A method for evaluating measurement data from a light field microscope, comprising the following steps:
    a) selecting at least one sample position in a sample to be analyzed;
    b) recording multiple images of the sample at a sequence of recording times using a light field microscope, wherein for each image of the sample a set of partial images is being simultaneously recorded at different angles relative to the sample;
    c) wherein positions corresponding to the selected sample positions are determined in the partial images of the recorded images;
    d) extracting image signals from at least some of the partial images at the determined positions;
    e) obtaining an integrated signal for a certain recording time by the image signals extracted for a certain position from partial images of this recording time being integrated to form the integrated signal; and
    f) obtaining a time profile of the integrated signal by obtaining the integrated signal for a plurality of recording times.

2. The method as claimed in claim 1,
wherein
the at least one sample position to be analysed is selected by a user:
    from a two-dimensional or three-dimensional overview images of the sample that is in particular already available,
    on the basis of an observation of the sample using an eyepiece, and/or
    on the basis of a 2-D image obtained using an EDOF method or an objective having a greater depth of field.

3. The method as claimed in claim 2, wherein the overview image of the sample is obtained using a laser scanning microscope.

4. The method as claimed in claim 2, wherein the overview image of the sample is obtained using the light field microscope, in particular by reconstructing a set of partial images obtained by the light field microscope.

5. The method as claimed in claim 4, wherein the reconstruction of the three-dimensional overview image is obtained by a deconvolution algorithm using the point spread functions of the micro-lenses of a multi-lens array of the light field microscope.

6. The method as claimed in claim 4, wherein the reconstruction of the three-dimensional overview image is obtained by a separate calculation of the image content for the individual axial sample planes, with the image content of a certain axial sample plane being calculated by each partial image of the set of partial images being shifted by a parallactic shift expected for the axial sample plane and with the set of shifted partial images being summated, and the three-dimensional overview image is assembled from the image contents for the individual axial sample planes.

7. The method as claimed in claim 1, wherein the positions in the partial images of the light field data that correspond to the sample positions which are selected in the three-dimensional overview image and which are intended to be analyzed are calculated.

8. The method as claimed in claim 6, wherein the images of the sequence of recording times are each evaluated at a multiplicity of positions.

9. The method as claimed in claim 1, wherein the sample positions to be analyzed are selected in the three-dimensional overview image by a user and/or partly or completely automatically by an evaluation unit.

10. The method as claimed in claim 1, wherein sample positions selected by a user are transferred to a convolutional neural network (CNN) together with a set of partial images, the convolutional neural network proposing to the user a preselection of sample positions to be analyzed in subsequent implementations of the method.

11. The method as claimed in claim 1, wherein the image data from the three-dimensional overview image and/or from the images of the light field microscope are machine-analyzed and structures of interest are searched for therein.

12. The method as claimed in claim 1, wherein an algorithm implementing an automatic assignment of image signals to certain structural features is used for the image evaluation.

13. The method as claimed in claim 1, wherein the partial images from which the image signals are extracted at the positions selected by a user and/or automatically by an evaluation unit.

14. The method as claimed in claim 1, wherein a set of partial images of an image of the sample recorded by the light field microscope is partly or completely represented graphically for the selection of partial images from which the image signals are extracted at the determined positions.

15. The method as claimed in claim 14, wherein integration regions for calculating the integrated signals are defined graphically by a user, in particular with assistance by a segmentation algorithm, or fully automatically by a segmentation algorithm in the graphical representation, in particular of portions of the partial images.

16. The method as claimed in claim 1, wherein a minimum value or a start value, in particular the minimum value of the integrated signal obtained for the evaluated images from the sequence of recording times or the integrated signal obtained for the first image in time, is subtracted from the integrated signals determined for a certain position or the integrated signal is divided by the minimum value or the start value.

17. The method as claimed in claim 1, wherein the time profile of the integrated signal is represented graphically for at least one evaluated position, preferably for a plurality of evaluated positions and in particular for every evaluated position.

18. The method as claimed in claim 1, wherein a time-varying shift of images of the sample recorded at different recording times is determined by virtue of the images recorded at different recording times being compared to one another.

19. The method as claimed in claim 18, wherein a spatial correlation is calculated for the images to be compared for the purposes of the comparison of images recorded at different recording times.

20. The method as claimed in claim 18, wherein a displacement vector relative to a reference image, for example the last image recorded prior to the relevant recording time, is determined for at least one recording time, in particular for a plurality of recording times and in particular for each recording time, for an image recorded at this recording time, and the set of partial images of the image is corrected using the determined displacement vector prior to the further processing.

21. The method as claimed in claim 1, wherein a selection of advantageous partial images, in particular less than ten partial images, preferably less than five partial images and particularly preferably two partial images, is evaluated in each case for the analysis of time-varying shifts of images of the sample recorded at different recording times.

22. The method as claimed in claim 1, wherein the central partial image is in each case analyzed for images recorded at different recording times in order to determine lateral shifts with respect to the optical axis, and a partial image from a lens located on an outer ring of the multi-lens array, in particular on the edge, is analyzed in order to detect axial displacements, in particular displacements parallel to the optical axis.

23. An apparatus for light field microscopy, comprising:
a light field microscope having a light source for emitting excitation light,
an illumination beam path with at least one microscope objective for guiding the excitation light onto or into a sample,
a two-dimensionally spatially resolving detector for detecting the light emitted by the sample,
a detection beam path with at least one micro-lens array for guiding the light emitted by the sample onto the detector,
a control and evaluation unit for controlling the light source and the detector and for evaluating the measurement data obtained by the detector, wherein the control and evaluation unit is configured
A) to control the light source and the detector to record multiple images of the sample in a sequence of recording times, the images each comprising a set of partial images;
B) to determine positions in the partial images of the images recorded, the positions corresponding to sample positions selected in the sample by a user or by a machine;
C) to extract the image signals from at least some of the partial images at the positions determined in B);
D) to generate an integrated signal for a certain recording time by integrating the image signals extracted for a certain position from partial images of this recording time C); and
E) to carry out D) for a plurality of recording times.

24. The apparatus as claimed in claim 23, wherein the micro-lens array is arranged in a plane optically conjugate to the back pupil of the microscope objective.

25. The apparatus as claimed in claim 23, wherein the micro-lens is arranged in a plane optically conjugate to a plane of the sample.

26. The apparatus as claimed in claim 23, wherein a module for laser scanning microscopy is present for the purpose of recording the three-dimensional overview image of the sample.

27. The apparatus as claimed in claim 23, configured to carry out the method as claimed in claim 1.

* * * * *